United States Patent
Shcheglov et al.

(10) Patent No.: US 9,060,346 B1
(45) Date of Patent: Jun. 16, 2015

(54) LOCAL POSITIONING AND RESPONSE SYSTEM

(71) Applicant: UNLICENSED CHIMP TECHNOLOGIES, LLC, Van Nuys, CA (US)

(72) Inventors: Kirill Shcheglov, Van Nuys, CA (US); Phillip Berquam, Van Nuys, CA (US)

(73) Assignee: Unlicensed Chimp Technologies, LLC, Van Nuys, CA (US)

( * ) Notice: Subject to any disclaimer, the term of this patent is extended or adjusted under 35 U.S.C. 154(b) by 0 days.

(21) Appl. No.: 14/558,407

(22) Filed: Dec. 2, 2014

Related U.S. Application Data

(60) Provisional application No. 61/916,380, filed on Dec. 16, 2013, provisional application No. 61/910,843, filed on Dec. 2, 2013.

(51) Int. Cl.
  *H04M 1/00* (2006.01)
  *H04W 64/00* (2009.01)
  *H04W 4/02* (2009.01)

(52) U.S. Cl.
  CPC ............. *H04W 64/00* (2013.01); *H04W 4/02* (2013.01)

(58) Field of Classification Search
  CPC .............................. H04W 16/28; H04W 24/02
  USPC ......... 455/15, 422.1, 562.1, 103, 277.2, 63.1, 455/7; 343/797; 370/338, 334
  See application file for complete search history.

(56) References Cited

U.S. PATENT DOCUMENTS

| | | | |
|---|---|---|---|
| 5,317,140 A | 5/1994 | Dunthorn | |
| 7,466,262 B2 | 12/2008 | Stephans | |
| 2002/0131643 A1 | 9/2002 | Fels et al. | |
| 2004/0006424 A1 | 1/2004 | Joyce et al. | |
| 2004/0171388 A1 | 9/2004 | Couronne et al. | |
| 2006/0139750 A1* | 6/2006 | Solomon | 359/462 |
| 2007/0152157 A1 | 7/2007 | Page | |

(Continued)

FOREIGN PATENT DOCUMENTS

WO 9935706 A2 7/1999

OTHER PUBLICATIONS

ISR and Written Opinion received in PCT/US2014/068203, dated Mar. 2, 2015, 17 pages.

*Primary Examiner* — Kiet Doan
(74) *Attorney, Agent, or Firm* — ARC IP Law, PC; Joseph J. Mayo

(57) ABSTRACT

Enables a local positioning and response system that allows devices in a defined area to determine their local positions in the area, and to generate individual responses based on their positions, for example based on broadcast messages. Responses can include light, sound, shock, vibration, temperature or any other physical signal. Positioning may use overlapping shaped beam signals that permit each device to determine its local position. Response to broadcast messages with local position dependency enables efficient communication with potentially thousands or millions of response units over limited bandwidth channels. Efficient communication may also be supported by messages containing high-level graphical primitives, with devices determining their individual contributions to an aggregate image. The system may also provide correction for image distortions. Applications include stadium light or sound shows, virtual fences, feedback on performance that requires specific motions or positions, and contests for event spectators.

33 Claims, 12 Drawing Sheets

(56) References Cited

U.S. PATENT DOCUMENTS

| | | |
|---|---|---|
| 2009/0259432 A1 | 10/2009 | Liberty et al. |
| 2013/0116044 A1* | 5/2013 | Schwartz ........................ 463/29 |
| 2013/0210491 A1* | 8/2013 | Eriksson et al. ........... 455/562.1 |
| 2013/0217333 A1 | 8/2013 | Sprigg et al. |
| 2014/0074361 A1* | 3/2014 | O'Connor et al. .............. 701/50 |
| 2014/0171122 A1 | 6/2014 | Ortiz et al. |

* cited by examiner $$h^2 = |\vec{r}|^2 - d^2 = |\vec{r} - \vec{r}_{12}|^2 - (|\vec{r}_{12}| - d)^2$$

$$\vec{r} \cdot \vec{r}_{12} = |\vec{r}_{12}|d \quad \rightarrow \quad d = \frac{\vec{r} \cdot \vec{r}_{12}}{|\vec{r}_{12}|}$$

LOCAL POSITIONING AND RESPONSE SYSTEM

This application claims the benefit of U.S. Provisional Patent Application Ser. No. 61/916,380, filed 16 Dec. 2013 and U.S. Provisional Patent Application Ser. No. 61/910,843, filed 2 Dec. 2013, the specifications of which are hereby incorporated herein by reference.

BACKGROUND OF THE INVENTION

1. Field of the Invention

One or more embodiments of the invention are related to the field of positioning systems, data processing systems and communication systems. More particularly, but not by way of limitation, one or more embodiments of the invention enable a local positioning and response system configured to transmit signals such as two or more shaped beams from at least one transmitter unit and devices that receive the shaped beams. The devices determine their local position in a defined area, such as a stadium or other venue that may not enable access to satellite based positioning signals. The devices determine their individual responses based on their local position and on broadcast messages that may define aggregate responses for a group of devices in the area. A response may include, but is not limited to emitting a physical signal such as a light, sound, message of any type based on the local position determined by the device and the broadcast message.

2. Description of the Related Art

With the advent of handheld computing devices such as smart phones, Personal Digital Assistants (PDAs), tablet computers, etc., a need has arisen to enable those devices to determine their position in space. A large number of techniques have been devised to accomplish this task, including Global Positioning System (GPS) and similar technologies that utilize triangulation based on relative signal delays to multiple transmitters along with very sophisticated computational algorithms. In addition, other techniques include received combination power based methods used in some cell phones, and various other more esoteric techniques, such as ultrasonic GPS, for example. While fairly successful in determining approximate location, these methods suffer from a number of limitations. GPS requires a "clear sky", i.e. clear line of sight to multiple satellites along different directions. The received signals are so weak that even a tree canopy tends to attenuate the signals enough to preclude accurate positioning. Indoors, the signal attenuation prevents GPS from working altogether. Some other methods, such as cell phone based techniques can operate indoors, where signal strength can be much higher due to proximity of the transmitters and much higher available electrical power on the ground. This technique is limited by the fortuitous placement of antenna towers, as well as by the sensitivity of the received signal strength to absorption along the signal path, reflections, and diffraction. These effects render this technique of positioning inaccurate, limiting the accuracy in dynamic and unpredictable ways.

Recently a need has been recognized to enable positioning of simple inexpensive devices in a fairly limited area, a venue such as a large hall, a warehouse, a parking lot, or a stadium. The position of interest is in a virtual relative coordinate system tied to the venue as opposed to global geocentric coordinates, which include latitude and longitude. The desired accuracy ranges for local position systems depend on the desired application, for example from around 1 foot, or 0.3 m, for determining the position of a person-sized object), to around an inch, or 2.5 cm, for tracking smaller objects like packages or communicating with sensors, lights, etc. There are no known existing systems that provide accurate local positioning in a limited area with inexpensive devices.

In addition, many applications require that a potentially large number of devices in a limited area create a response that is observable in aggregate. For example, all devices in a house may be commanded to turn off, with reduced power consumption as the observable aggregate response. As another example, spectators at a football game may be given light-emitting devices, and the sponsors of the game may desire that these lights be coordinated to emit stadium-sized images that are visible from television cameras. Technologies exist to provide communication between central systems and a network of devices; however these systems generally use point-to-point communication and require significant bandwidth as well as significant power and cost in the devices. Further issues such as privacy and anonymous addressing of the devices make mobile phones and other handheld devices less desirable for this application.

The number of usable devices that may respond to system messages is growing dramatically, and current system architectures are not suited to handle this growth. For example, with the advent of inexpensive radio transceivers and microprocessors, an increasing number of common household items are attaining both some computer intelligence and wireless connectivity. This trend is expected to continue and speed up as electronics technology advances and electronic components become cheaper. In the not so distant future, an average house may contain hundreds of Wi-Fi-connectable items. It is conceivable that in the near future, all items of non-negligible value may be equipped with rudimentary wireless transceivers and some processing power. All these thousands of transceivers will occupy the same limited portion of the radio spectrum and thus the data rate available for communicating with any individual unit will become vanishingly small, in effect debilitating the wireless communicating capability of the devices.

In areas greater than the size of a house, the number of devices may be even larger. Potentially there may be a need to communicate with millions of such devices over fairly modest bandwidth resources. Existing system architectures, which are based largely on point-to-point communication, cannot handle these requirements. Moreover the systems that provide location-awareness, such as GPS, require expensive transmitters and receivers and are ill-suited for widespread application and low-cost, low-power devices.

For at least the limitations described above there is a need for a local positioning and response system, which provides an architecture and a system solution for low-power, low-cost devices to determine their position and generate responses without requiring large amounts of network bandwidth for communication.

BRIEF SUMMARY OF THE INVENTION

One or more embodiments described in the specification are related to a local positioning and response system. Embodiments of this system enable a local positioning and response system configured to transmit signals such as two or more shaped beams from at least one transmitter unit and devices that receive the shaped beams. The devices determine their local position in a defined area, such as a stadium, sports field, concert hall, amphitheater, theater, track, gymnasium, arena or any other location that may not enable access to satellite based positioning signals. The devices determine their individual responses based on their local position and on broadcast messages that may define aggregate responses for a group of devices in the area. A response may include, but is not limited to emitting a physical signal such as a light, sound, message of any type based on the local position determined by the device and the broadcast message. Thus embodiments of the system provide an efficient and effective system to generate responses in a potentially large number, or extremely large number of devices located in a local area. Embodiments of the system enable local positioning, in contrast to systems like GPS that provide absolute position relative to a worldwide reference frame. Some embodiments of the system may also incorporate GPS or similar absolute positioning systems as well, but do not require GPS.

An illustrative embodiment of the system includes four major components: a server to coordinate messages, beam transmission units that send signals such as shaped beams that are used for position determination, message transmission units that send messages and response units that receive the signals and determine their location and emit responses. In some embodiments the beam transmission units and the message transmission units may be integrated or otherwise coincide to form a transmission unit. The term transmission unit as utilized herein may refer to the combined beam and message transmission unit or separate units for brevity. Any portion of the electromagnetic spectrum may be used for either beam transmission or message transmission or both.

Each beam transmission unit may include two or more shaped beam antennas that generate shaped beam signals. These signals are broadcast to a portion of the local area. Multiple beam transmission units may be used to cover the entire local area; in some embodiments only a single beam transmission unit may be utilized depending on the size of the area and application.

In one scenario, one or more devices, or response units, are located in the local area. These response units are configured to receive the shaped beam signals from the transmitter units and the messages, for example from the server. The response units may include a processor that may for example use the received shaped beam signals to calculate the local position of the response unit. Based on this local position, and on the messages received from the server, each processor determines an individual response that is appropriate for that particular response unit. These responses are executed by components in the response units that are referred to as action modules herein. Each action module may emit or modify one or more physical signals, such as light, sound, vibration, non-visible light, electricity, shock, or buzzing.

The overall system therefore provides a capability for multiple response units located at different places in a local area to generate a location-dependent output based on broadcast signals and messages. In some embodiments the response units may be capable of being worn by a person, or of being held by hand; the aggregate response may therefore be tied to the location of the user or actions of the user. For example, the system may be used for generating a light show with complex shapes and patterns using a large number of response units held by spectators in a stadium. Thus, patterns or text or images or colors or sounds or any combination thereof may be output from the response units in a location dependent manner.

In one or more embodiments, the system may be configured to correct for potential distortions in the observed responses from the response units. These distortions may arise in many ways, such as from reflections or attenuation of signals, from interference of other signals, or from the shape of the local area. For example in a stadium light-show application, the shape of the stadium stands may induce some distortion in the displayed images. Distortion correction may use test pattern messages along with cameras that observe the responses to these test patterns. The server can compare the observed images to the test patterns and apply distortion corrections to future messages. Some embodiments may use infrared light for responses to test patterns so there is no interference with visible images.

In one or more embodiments, some or all of the response units may also incorporate sensors, such as accelerometers, gyroscopes, rate gyroscopes, pressure sensors, temperature sensors, magnetometers, sensors of human physiology, depth sensors, motion sensors, velocity sensors, or proximity sensors. Messages from the server directing responses may then make such responses dependent on both local sensor readings and on the calculated local position of each response unit. For example, personnel on a work site could be given response units that include a temperature sensor. These response units could be commanded to emit a warning light or sound if the temperature becomes dangerously high. Response units can be configured to send sensor readings back to the server, using a transmitter in the response units and receivers in the system. Sensor readings can be returned on request from the server, or based on server-specified criteria or thresholds.

In one or more embodiments, the response units may also include one or more user input devices, such as keypads, touchscreens, buttons, or joysticks. As with the sensor data, the response units may include transmitters to transmit user input back to the server, and the server may be configured to accept or otherwise poll for user input data depending on the intended application.

Response units may calculate their local position using the intensity of the shaped beam signals that they receive. In some embodiments the intensity pattern of the shaped beam signals may be approximately Gaussian, which simplifies the calculation of the local position. In particular, relatively simple hardware may be used in the response units to derive local position from a combination of Gaussian signals. Some embodiments use the relative intensity multiple shaped beam signals rather than their absolute intensity. This approach offers the advantage of automatically compensating for many distortions of beams that emanate from the same beam transmitter. Other embodiments may employ any type of shaped beam pattern so long as the response units are aware of the type of beam employed.

Accurate calculations of local positions depend in part on the precision of the manufacturing, installation, and calibration of the beam transmission units and the shaped beam signals. Different embodiments may employ levels of precision that are appropriate to their application. For example, embodiments may allow local position to be accurate within 3 feet, within 1 foot, or within 1 inch, or approximately 1 m, 0.3 m, 2.5 cm or any other accuracy based on the accuracy of the positioning of the antenna or other emitters within the transmission units for example. In one or more embodiments, the antenna may be moveable to set alternate angles for the beams to enable a transmitter unit to be used for a small or large venue, e.g., by changing the angle of the antenna with respect to a centerline for example. Other embodiments may include shaped beam antenna that may be set at a fixed orientation with respect to one another, for example at the time of manufacture or calibration.

Some embodiments provide for the display of images on a set of response units. For example, as mentioned above, an embodiment of the system may be used to create relatively large images on a stadium by giving light-emitting response units to the spectators. In this scenario, the spectators may in effect form pixels or "peopixels" in the image. In some of these embodiments, the server computer may store or generate one or more graphical images and transmit messages to the response units to display these images on the response units. Some embodiments may treat each response unit as a pixel in the image or as a portion of a soundscape or both to produce multimedia displays. The processor of each response unit may calculate its location, and then determine the intensity and color of the light to emit from the response unit based on its location and on the image messages received from the server. The combination of all response units forms an overall image. The server may also break an image into sub-images and send different messages to groups of response units to construct an overall image from the sub-images.

Messages from the server to display graphical images may in some embodiments contain descriptions of one or more shapes, and potentially also of the shapes' motion over time. Such high-level graphics primitives in the messages allow messages to be efficiently broadcast to potentially large numbers of response units, with each response unit determining its appropriate output to form the aggregate images. Messages may also include error correcting (or error detecting) codes to eliminate the need for return acknowledgements or retransmissions, further improving efficient use of possibly limited bandwidth. Other message codes may be encrypted or otherwise protected to prevent third parties from hijacking the images or sounds displayed for example. In one or more embodiments, an event encryption code may be stored in the response units and utilized by the server and response units to encrypt and decrypt messages transmitted between the various components in the system.

Applications for some embodiments of the system may include providing a virtual fence around a portion of a local area. In these embodiments response units may be equipped with feedback devices that are actuated when a response unit moves out of or close to the boundary of this virtual fenced-in portion. For example, the wearer of a response unit might be given a shock to stop the wearer from leaving the fenced-in portion, which may be useful for invisible livestock or pet fences.

Other applications in other embodiments may include feedback to sports players or coaches when a player moves into or out of a prescribed location, area, or trajectory. For example, a football receiver in practice may be practicing running a particular pattern. The player might wear a response unit that lights up or turns a different color if the player does not run the correct pattern. This feedback might alert coaches that the player made an error. Similar applications enable military troop movements to be sensed and otherwise observed and mapped and enables secure communication for devices that are within a predefined area.

In other applications in one or more other embodiments, response units may be integrated into or embedded into road signs or road reflectors. Embodiments of these response units may be commanded to light up to alert drivers of conditions, issues, or potential hazards. For example, the system may detect when a car is approaching one side of a blind turn, and activate response units on the other side of the blind curve to warn other drivers of the approach. The activated response units might for example light up, flash, or change colors. In some embodiments the detection of an approach may also be made by response units in the approaching vehicle; these response units may use local positioning to determine that they are in the approach area, and send a message to the server to broadcast alerts to other vehicles to alert other drivers. In one or more embodiments, one or more vehicles may also include an embodiment of the response unit and automatically dim headlights, for example when within a predefined distance from another of the response units mounted on another vehicle, e.g., 100 meters or the local limit according to the law at that location. Alternatively or in combination, one or more embodiments may detect road conditions and tag the event with a position, so that other vehicles approaching the road condition, e.g., ice detected by the slip detection module in the vehicle and/or accelerometers are alerted to the road condition at a location and for example time.

In some other embodiments the system might be used for contests or to award prizes to a subset of the response units. For example, server messages might select a particular location or locations for awards and send messages to provide feedback to response units in only those locations that they have won awards. The selection of response units for awards or prizes may for example be random, based on location, based on sensor readings, or based on user input.

Other embodiments may include two-way Liquid Crystal Display (LCD) screens attached to seats in an arena or stadium or otherwise coupled fixedly or removeably thereto that may be utilized for advertising, offers, voting, light shows, food, beverage or memento ordering for example.

Embodiments of the invention may also show winners at particular locations or show anyone who has entered a particular vote over the entire area, for example for users that voted for their favorite driver in a stock car race and for example after that driver has won the race. In addition, embodiments may provide more information for users that input or otherwise provide more information back to the server. Embodiments of the response units may include inputs that allow a user to register at an event and obtain more offers or increased capabilities, which may be of great value for corporate sponsors for example.

Embodiments may also be utilized for location specific displays or games. For example, in a museum, art gallery, arboretum, convention, or real estate location, displays local to the response units may indicate location dependent information, such as the name of the item or inventor, name of the painting, sculpture or artist, name of the plant, information related to a poster or object in a booth, or portion of a real estate property respectively. In addition, scavenger hunt type games or any other game that includes different locations in an area may employ embodiments of the invention to enable data or commands at specific locations to be accessed for example.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION OF THE INVENTION

A local positioning and response system will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
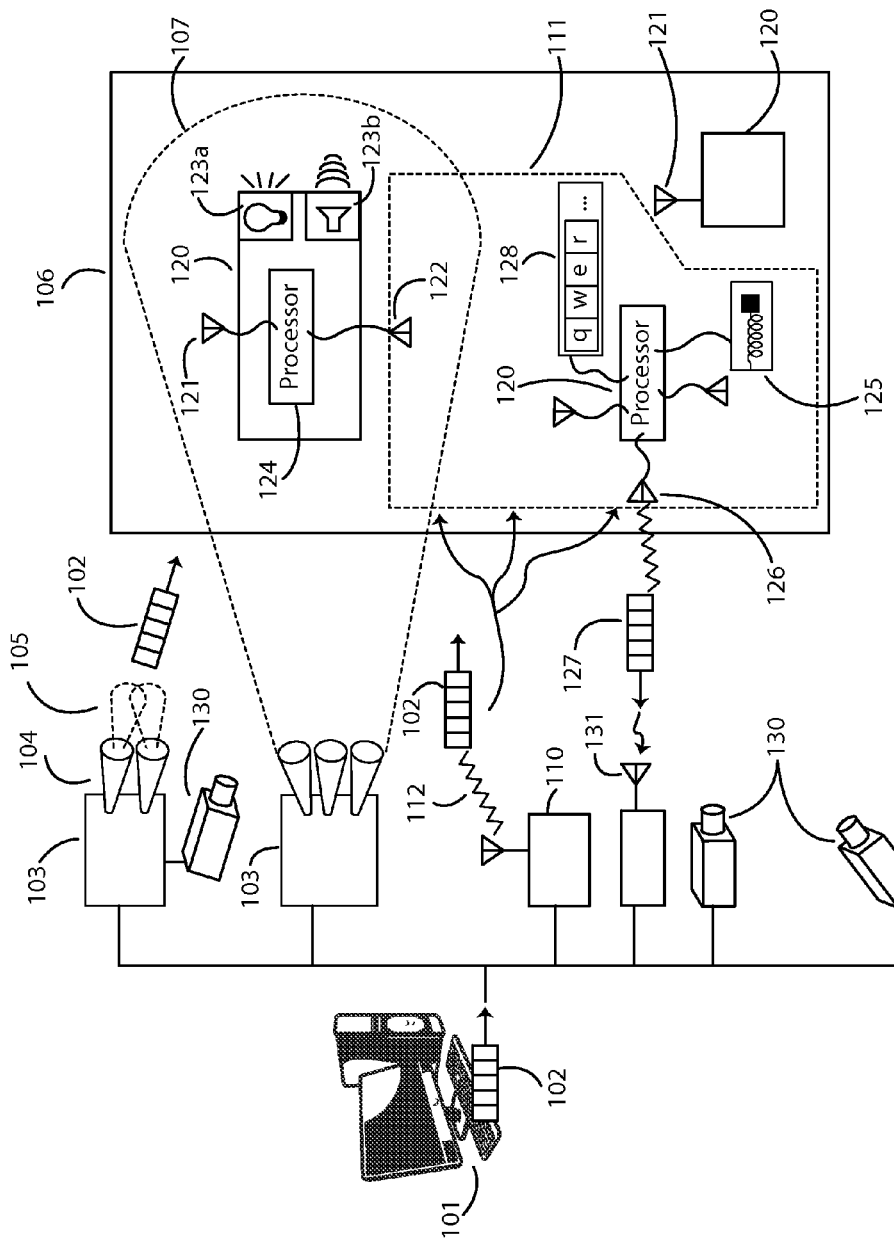
FIG. 1 illustrates an architectural view of at least one embodiment of the local positioning and response system.

FIG. 1 illustrates an architectural view of at least one embodiment of the local positioning and response system, including exemplary components that may be utilized therewith. Such a system provides mechanisms for devices to determine their position relative to a local area 106. This local positioning is in contrast to systems like GPS that provide absolute position relative to a worldwide reference frame. Some embodiments of the system may also incorporate GPS or similar absolute positioning systems as well, but GPS or other satellite based positioning is not required by embodiments of the invention. Embodiments of the invention may provide a response system by which these devices can respond to messages from the system based in part on their local position.

One or more embodiments incorporate a server computer 101 that coordinates the local positioning and response. In some embodiments the server hardware may be ruggedized for outdoor use, such as a ruggedized high performance laptop running a UNIX-based operating system. Some embodiments may incorporate one or more backup servers for high availability.

The server computer may store or generate messages 102 that are used to guide the positioning and response by individual devices. Other control and calibration messages may also be stored or generated by the server.

The system may include one or more beam transmission units 103. These units provide a component of the positioning capability of the system. Each beam transmission unit 103 may have multiple shaped beam antennas 104 that generate shaped beam signals 105. In an embodiment shown in FIG. 1, one of the two beam transmission units has two shaped beam antennas, and the other has three shaped beam antennas. The shaped beam signals 105 are broadcast to a portion of the local area, for example 107. Multiple beam transmission units may be used to cover the entire local area 106; in some embodiments only a single beam transmission unit is utilized depending on the size of the area and particular embodiment of the transmitter unit. Each shaped beam signal 105 has a predefined intensity profile at each point in space as a function of the distance of this point from the beam antenna and the direction of this point from the beam antenna's center ray. In one embodiment for stadium applications, the beams may be directed 10 to 15 degrees off of the centerline. In a museum application, the beams may be directed 30-45 degrees off of the centerline. Any other angles of at least one power lobe of any antenna pattern or shape that enable the beams to overlap an area with different intensities is in keeping with the spirit of the invention, including any phased array antennas that may transmit different signals in different directions off of the centerline. A phased array antenna is considered an equivalent of a plurality or more of shaped beam antennas in keeping with the spirit of the invention, so long as a plurality of overlapping shaped beams are formed by the phased array antenna. The beam transmission units may be connected to the server computer by a wired or wireless network. In some embodiments the server may not require a connection to the beam transmission units if the shaped beam signals are constant and are not used to transmit messages.

Figure 2:
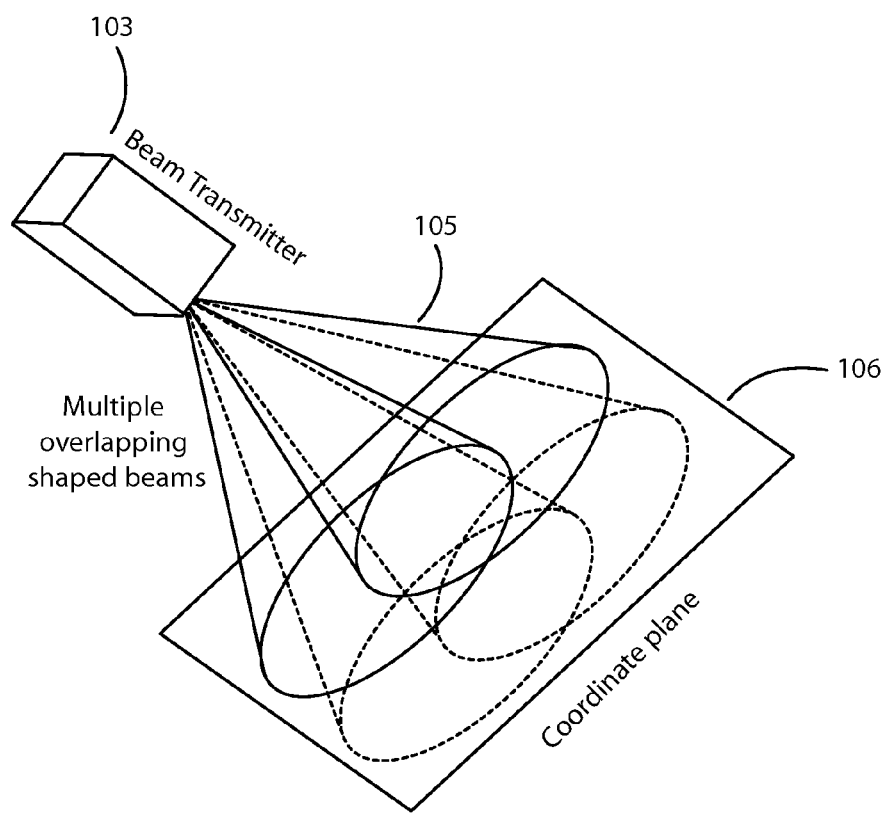
FIG. 2 illustrates an embodiment of the broadcast of overlapping shaped beam signals that allow response units to calculate their local position.

FIG. 2 illustrates an embodiment with these shaped beam signals overlapping on a plane area 106 where response units may be placed.

Figure 3:
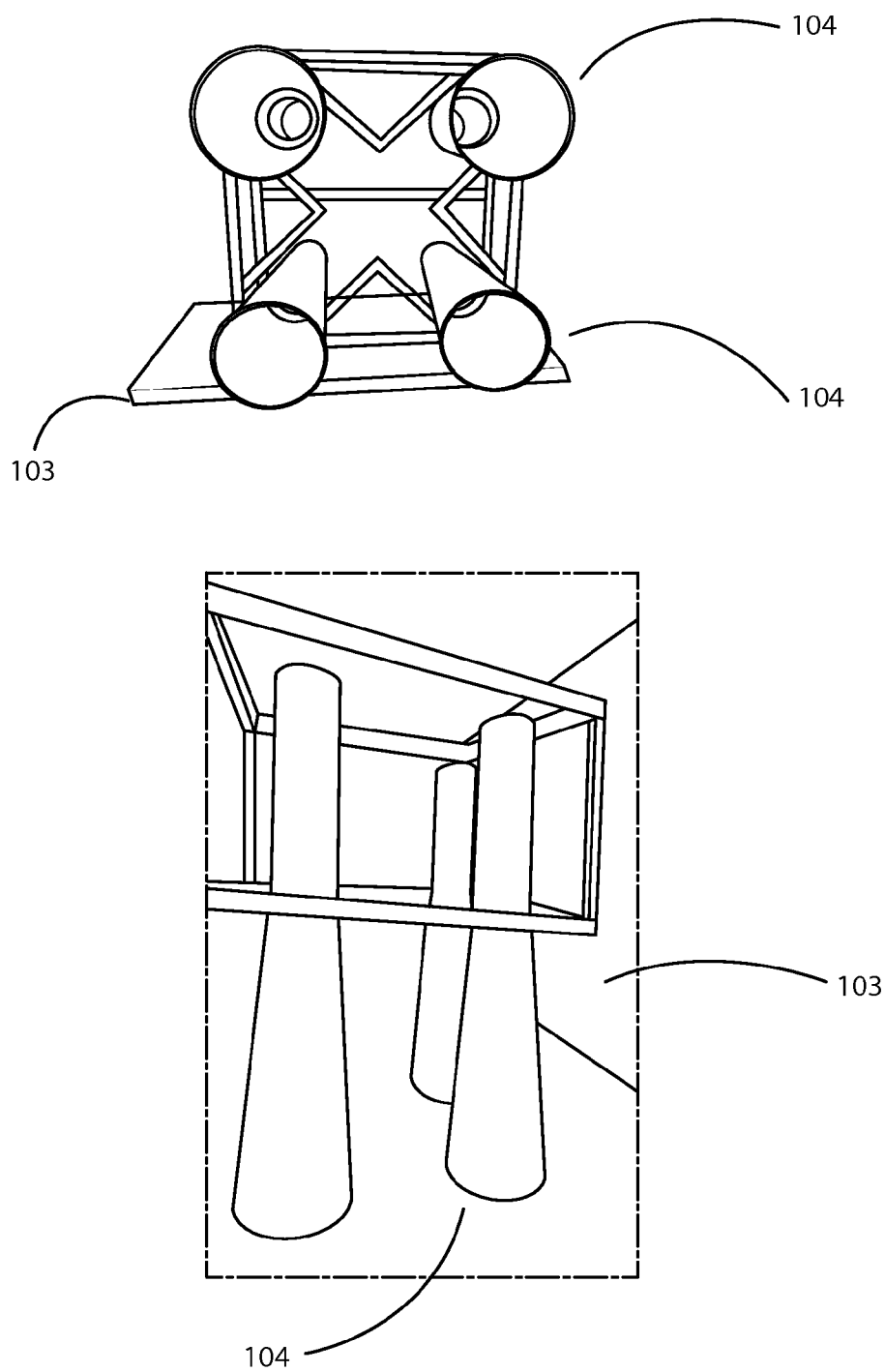
FIG. 3 illustrates a front view and a side view of an embodiment of a shaped beam transmission unit.

FIG. 3 illustrates front and side views of an embodiment of a beam transmission unit 103 with four shaped beam antennas 104. In this embodiment each beam antenna is aimed in a slightly different direction so that the shaped beam signals are offset somewhat from one another but overlap in a significant portion of the local area.

Referring again to FIG. 1, in addition to sending shaped beam signals, the system may send the messages 102 stored or generated by the server. These messages may be sent via signals 105 as part of the shaped beam signal via beam transmission units 103 or via separate message transmission units such as 110. In one or more embodiments these messages are broadcast to the local area 106, or to a portion of the local area such as 111, rather than being addressed or routed to individual devices. In some embodiments the message transmission units may be connected to the server by a wired or wireless network. Some embodiments may use synchronized clocks between the server and the message transmission units or the beam transmission units that enable the transmission units to transmit commands at appropriate synchronized times.

One or more embodiments may use radio frequency signals for the transmission of the shaped beam signals or the messages. Some embodiments may use light signals for these transmissions, either visible or invisible light (such as infrared). The shaped beam signals 105 and the signals 112 for transmission of messages 102 may use the same spectrum or different parts of the spectrum. Any portion of the electromagnetic spectrum may be used for either type of transmission. For higher frequency implementations, a demodulation signal may also be sent from at last one of the antennas, or separate antenna, so that the response unit may demodulate the signals using the received demodulation signal, since it is difficult to make a local oscillator for higher frequencies. The demodulation process enables the response units to extract the message from the carrier wave using the supplied demodulation signal as one skilled in the art will recognize. Thus, the response units in one or more embodiments may be implemented with less sophisticated electronics to provide more energy efficient, or smaller, or lower price implementations or any combination thereof.

An illustrative embodiment of a transmission unit that includes a shaped beam transmitter, and a message transmitter, may include the following components. These components are for illustration only; other embodiments may use different components or may divide functionality into different units in keeping with the spirit of the invention. An illustrative transmission unit includes an industrial single board computer (SBC), an infrared (IR) grid projector, and a number of radio frequency (RF) transmitters that drive the shaped beam antennas. The server and SBC computers are linked through a communications network, such as a high speed Ethernet network and run custom software that distributes graphics commands to appropriate transmitters. The SBC receives commands and routes them to the transmitters at appropriate intervals triggered off a local clock synchronized to the server clock. It also drives the IR grid projector, and sends back system health state commands, which are continuously monitored and logged by the server.

Embodiments of the invention may utilize two shaped beams to provide for location determination in an iterative manner, wherein for example if the response units obtain equal power from each beam, then they are for example located on a line between the two signals. Through use of absolute power sensing in the response units to determine the distance away from the transmitter unit, the position may be determined. Alternatively, or in combination, iterating through a set of ratio numbers associated with power and sending that message to the area, wherein any response units that are observing that power ratio respond with a message having a identifier and at a time of output related to the identifier, the system may detect the output and code and determine the location of the particular response units for example by sampling IR images at a given rate and detecting response units that assert a message at a particular time with a particular code. The system may then transmit the location with the code back so that the location determination is performed in a combined effort.

Embodiments utilizing three or four shaped beams may provide efficient location determination capabilities and enable location determination local to the response units through comparison of the ratios of the power from three or more shaped beams for example to provide location determination along two or more axes.

The RF module may include an off-the-shelf transmitter board such as an eZ430-RF2500T containing a microcontroller and an RF transceiver. The Client SBC may communicate to the on-board microcontroller via a UART interface. It may run a near real-time operating system, such as a stripped down Linux. One or more embodiments may be implemented as close to real-time in order to keep a synchronized clock that has a resolution of better than 100 μsec. This enables a high data rate through the 500 Kbaud bandwidth without packet interference. Any other synchronization threshold may be utilized depending on the desired accuracy and cost of the system in keeping with the spirit of the invention.

The output power of the transmitter in one or more embodiments is matched to the operating scenario, specifically to the signal throw distance. To achieve an acceptable spatial resolution the receiver may be operated in the middle of its dynamic range and thus a nominal transmitter power is generally chosen for a particular installation. Radio wave propagation is such, that the power falls off with the square of the distance from the transmitter, so for every two times increase in signal throw distance, the transmitter power is thus be increased by a factor of four. In certain high RF background noise environments, increasing the power and operating closer to the top of the receiver dynamic range may be beneficial since the effective RF interference is thus reduced.

In IR grid projector may be an LED-based DLP projector modified to use an IR source instead of the LED's. The gridding code may include gray code frames with checksums and the frames may be calculated in advance, stored on the SBC and cycled through at an appropriate frame rate, for example such as 60 fps. Thus, a high fidelity coordinate fix is available to the response units roughly 3 times per second in one or more embodiments of the invention. In one or more embodiments, this enables cameras to detect the pattern projected onto the area, for example using non-visible IR light for distortion correction purposes. In one or more embodiments, if a particular response unit is displaying a light that does not match the pattern, for example if the response unit is not correctly calculating its local position, the server may send out a message for each unit to determine which response unit is incorrectly determining its position. The server may command response units iteratively to flash on and off to determine when response unit that has calculated an erroneous position and instruct that response unit to either turn off or to instruct the response unit of its correct position. Embodiments may also command the response units in parallel to transmit a coded IR series of on/off signals to effectively display a code, or alternatively turn on or off at a particular point in time, in order to determine which response unit is at a particular location, that for example is erroneous.

One or more devices, termed response units in this specification, are located in the local area 106. In some embodiments there may be a large number of response units located throughout the local area, for example in the thousands, tens of thousands, hundred thousand or even higher range. These response units 120 are configured to receive the shaped beam signals 105 and the messages 102 from the server. The shaped beam signal receiver 121 and the message receiver 122 may be the same receiver if for example the system transmits messages over the shaped beams or using the same general frequency range, or may be different receivers, for instance, using different frequencies or signal types, e.g., radio or light based signals. The response units include a processor 124 that uses the received shaped beam signals to calculate the local position of the response unit. Based on this local position, and on the messages received from the server, each processor determines an individual response that is appropriate for that particular response unit.

Responses by response units are executed by components that are referred to as action modules herein. Each action module may emit or modify one or more physical signals, such as light or sound or any other physical signal including but not limited to tactile signals, shock, temperature or any other type of signal. FIG. 1 illustrates a response unit with two action modules, 123a and 123b; 123a emits light and 123b emits sound. Other embodiments may use different numbers and types of action modules. The overall system provides a capability for multiple response units located at different places in a local area to generate a location-dependent output based on broadcasted signals 105 and messages 102. For example, the system might be used for generating a light show with complex shapes and patterns using a large number of response units held by spectators in a stadium. Some embodiments may include color LEDs in the response unit action modules to provide for color displays. Other embodiments may have both LEDs and sound output in the action modules to support synchronized light and sound shows.

An illustrative embodiment of a response unit may include the following components, which are for illustration only and other embodiments may use other components or divide functionality into different units. Such an embodiment can be packed into a small size so that it can be easily wearable or easily held in one hand for prolonged periods of time. (1) LEDs, for example with a power of 1.5 W. (2) A TI CC2500 RF transceiver, which provides a number of transmission formats, modulation options, receiver fine-tuning and frequency/power control, and data throughput of 500 Kbaud. (3) An MSP430 family microcontroller with off-the-shelf library function for communicating with the CC2500 and very low power usage, a good choice for long-run shows such as music events. (4) An IR receiver chip similar to a Vishay TSOP38456 operating at about 50 kHz and with a wide directivity (>45°). (5) A battery power supply such as an alkaline AAA cell, coupled with a voltage booster circuit, or a pair of CR2 batteries. (6) An electronics board that houses the LED, RF Receiver, processor, and battery, housed in a plastic shell that has a transparent diffusing window over the LED. In addition, embodiments of the response units may also include Internet Protocol communications elements or any other type of addressable communications components. This enables one or more embodiments to interact with the Internet, for example become part of the Internet of Things (IoT), while other embodiments may utilize messaging that does not include an IP address, so that the response units remain anonymous from the viewpoint of the Internet. Embodiments that do not utilize an IP address or IP communication or other heavyweight communications protocols remain extremely efficient from a bandwidth perspective.

Figure 4:
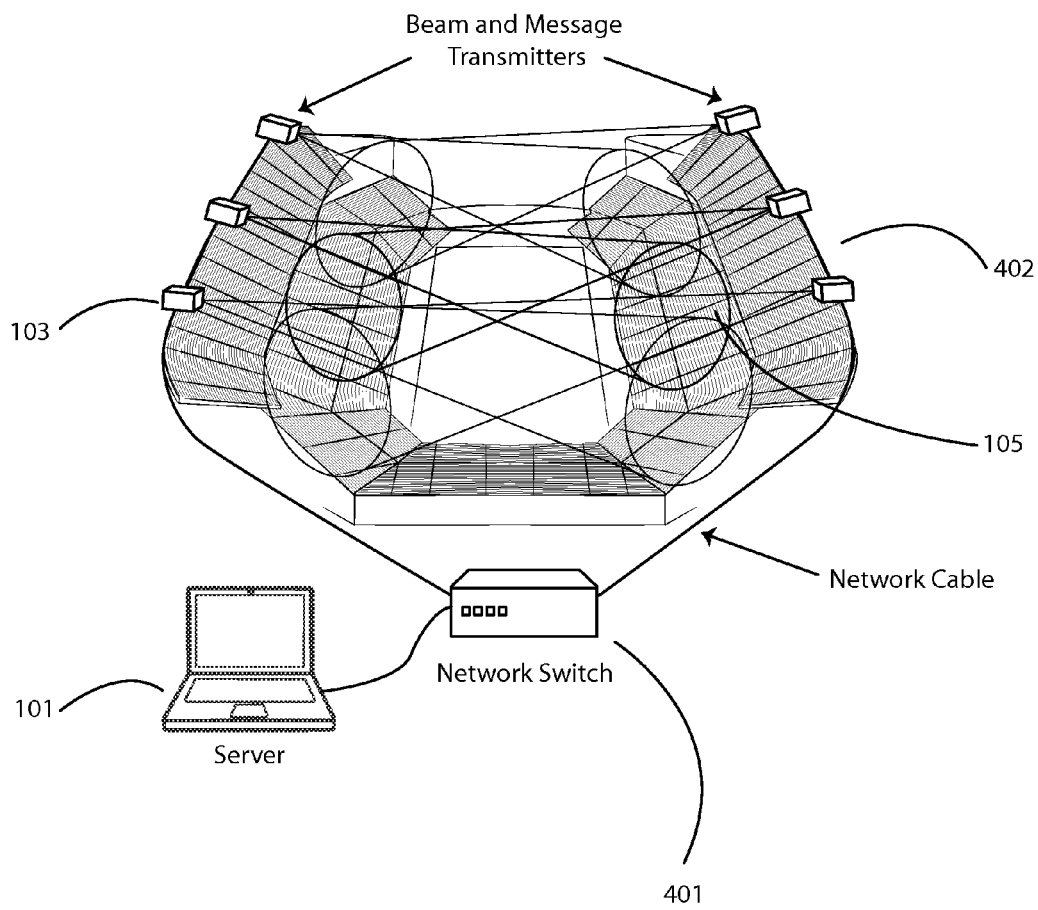
FIG. 4 illustrates an embodiment of a local position and response system installed in a stadium, with multiple beam transmission units sending shaped beam signals that together cover a large part of the stadium.

In one or more embodiments, the system may be configured to correct for potential distortion in the observed responses from the response units. These distortions may arise in many ways, such as from reflections or attenuation of signals, from interference of other signals, or from the shape of the local area. For example, an embodiment of the system may be used to create large images on a stadium by providing light-emitting response units to the spectators. The shape of the stadium stands may induce some distortion in the displayed images. An embodiment of a system installed in stadium is illustrated in FIG. 4. Server 101 is connected by network switch 401 to six beam and message transmitters 103. These six transmitters are installed to cover large portions of the stands of stadium 402 with their shaped beam signals 105.

Figure 5:
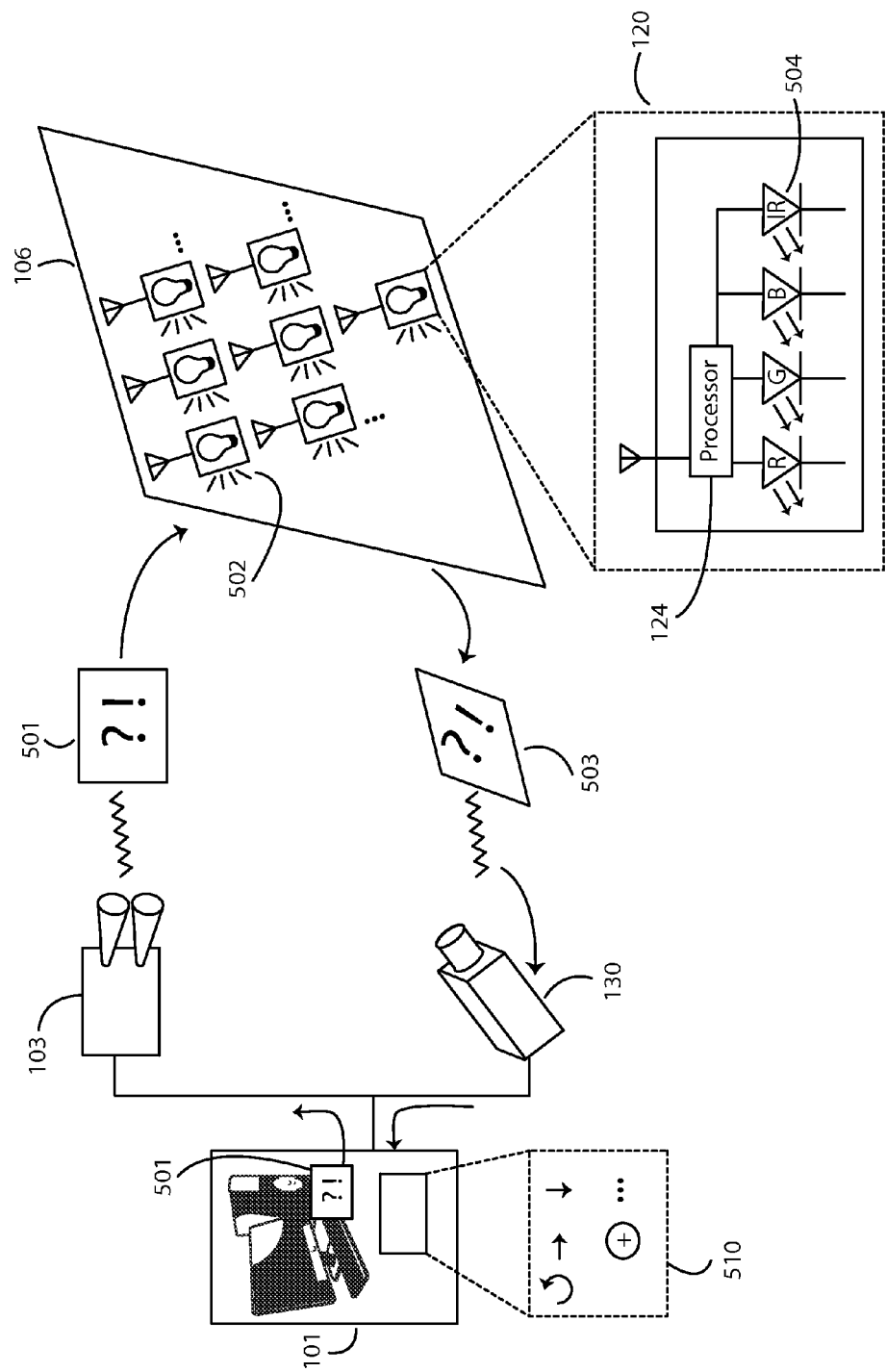
FIG. 5 illustrates an embodiment of a local positioning and response system that provides correction of image distortion.

One or more embodiments of the system may use special test pattern messages to measure and correct for distortion. An embodiment of such a system is illustrated in FIG. 5. Such test pattern messages 501 may be sent and the response units 120 may respond with visible outputs, such as lights 502. The system may include cameras 130 that can observe these outputs and send the observed images 503 to the server 101 for processing. By comparing the observed images 503 from the systems' cameras to the ideal expected images of the test patterns 501, the server can determine the distortion induced by the environment. It can then apply corrections 510 to the distortion so that subsequent outputs are minimally distorted. These corrections may consist of various transformations to images, including but not limited to translations, rotations, expansions or contractions, warping, color mapping, shading, and nonlinear transformations. The IR grid projector may be utilized in one or more embodiments to drive IR lights on the response units, such as lights 502 so that the test pattern does not interfere with any visible light pattern output by the response units. This embodiment enables run-time calibration for example.

For example, in some embodiments distortion corrections may include accounting for rotations and skewing of a plane of response units relative to a desired plane for observing an image formed by these response units. An analysis of the image distortion may include determining a projective transform, $$P = \begin{bmatrix} a_{11} & a_{12} & a_{13} \\ a_{21} & a_{22} & a_{23} \\ a_{31} & a_{32} & a_{33} \end{bmatrix}$$

that best transforms the observed pixels into the test pattern pixels. For example techniques such as least squares optimization can determine the optimal projection matrix that most closely aligns the observed image with the test pattern. This projective transform can then be applied to future images. For example, each pixel i in the test pattern may be represented with a point in homogeneous coordinates, $$r_i = \begin{bmatrix} x_i \\ y_i \\ 1 \end{bmatrix},$$

and each pixel i in the observed image may be represented with a point in homogeneous coordinates, $$s_i = \begin{bmatrix} u_i \\ v_i \\ 1 \end{bmatrix}.$$

A least squares determination of the optimal projection transform P would then minimize the error $\Sigma_i |r_i - P s_i|^2$.

In embodiments of the system with cameras, the cameras may be standalone or they may be attached to or integrated with the shaped beam transmission units. FIG. 1 illustrates both possibilities, with one camera 130 attached to a beam transmission unit 103, and two additional standalone cameras 130. Some embodiments may use non-visible light frequencies, such as infrared, for the generation and analysis of test patterns. As illustrated in FIG. 5, in such embodiments the response units may have for example infrared emitters 504, and the cameras 130 may include infrared capture elements. For example, the cameras 130 might include monochrome industrial Ethernet cameras with IR filters. A benefit of using non-visible light is that human observers of the system may not see the test patterns or the distortion correction process as it occurs.

In one or more embodiments, some or all of the response units may also incorporate sensors. FIG. 1 illustrates a response unit with an accelerometer sensor 125. Messages from the server directing responses may then make such responses dependent on both local sensor readings and on the calculated local position of each response unit. For example, personnel on a work site could be given response units that include a temperature sensor. These response units could be commanded to emit a warning light or sound if the temperature becomes dangerously high. Potential sensors may include, but are not limited to, accelerometers, gyroscopes, rate gyroscopes, pressure sensors, temperature sensors, magnetometers, sensors of human physiology, depth sensors, motion sensors, velocity sensors, or proximity sensors.

In some embodiments it may be desirable to transmit sensor readings back from response units to the server. In these embodiments some or all of the response units 120 may include transmitters 126, and the server may be attached to one or more receivers 131 to receive the messages 127 sent back from the response units 120. In some embodiments the server may be configured to send messages 102 requesting sensor data from the response units. Some embodiments may include messages that specify criteria for sensor readings, and instruct the response units to send sensor data only if it meets the specified criteria. For example, a server may poll periodically for sensor readings that exceed a threshold.

In one or more embodiments, the response units may also include one or more user input devices. Such devices might include for example keypads, touchscreens, buttons, or joysticks. FIG. 1 illustrates an embodiment of a response unit 120 with an attached keypad 128. As with the sensor data, the response units may be configured with transmitters 126 to transmit user input back to the server, and the server may be configured to poll for user input data as desired.

The action modules in the response units may emit or modify various types of physical signals, including, but not limited to, light, sound, vibration, non-visible light, electricity, shock, or buzzing, temperature or any other physical signal.

In some embodiments the response units may be capable of being worn by a person. For example they may include a strap, pin, clip, lanyard, or other attachment device to attach to clothing or to parts of the body. Some embodiments may incorporate response units into articles of clothing, caps or hats, or accessories such as jewelry or watches. In other embodiments the response units may be hand-held by a person.

Response units may calculate their local position using the intensity of the shaped beam signals that they receive. In some embodiments the intensity pattern of the shaped beam signals may be approximately Gaussian; this pattern can simplify the calculation of the local position.

Figure 6:
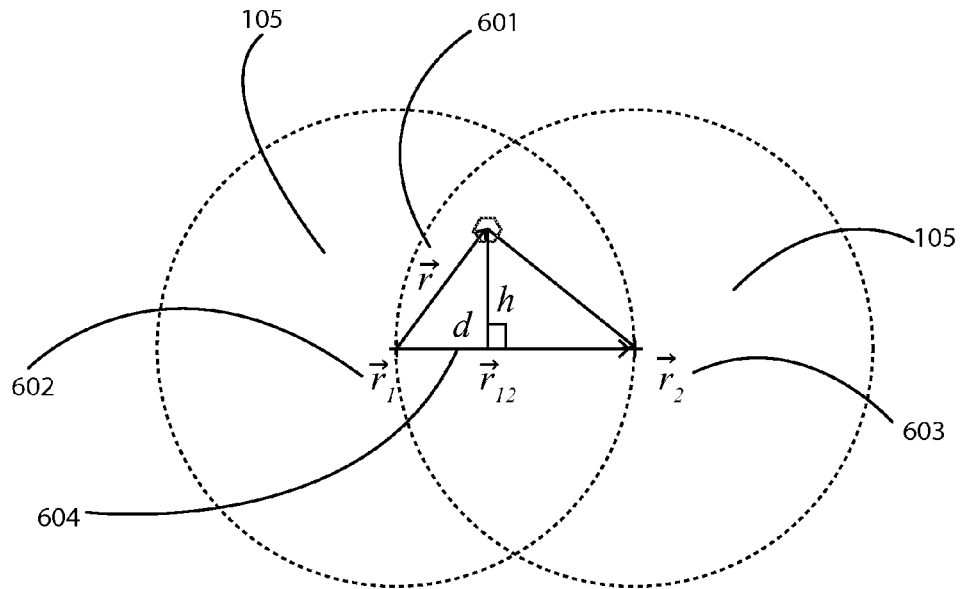
FIG. 6 illustrates the calculations of local position that may be used by some embodiments that employ Gaussian shaped beam signals.

FIG. 6 illustrates one embodiment of such Gaussian signals and the position calculations. As shown, two shaped beam signals 105 are projected onto a plane approximately perpendicular to the aim of the shaped beam antennas. Each of the Gaussian shaped beams 105 has an intensity I at location r 601 in this plane defined by $$I = I_0 e^{-|r-r_c|^2/2\sigma^2},$$

where $r_c$ is the location in the plane of the center ray of the beam, and $I_0$ and $\sigma$ are constants characteristic of the beam transmitter. For one of the two beams, the center ray's intersection with the plane is at $r_1$ 602, and for the other beam it is at $r_2$ 603. For Gaussian beams, the logarithm of the intensity permits a simple calculation to determine local position in the perpendicular plane. The natural logarithm of the intensity is:

$$\ln I = \ln I_0 - |r - r_c|^2/2\sigma^2.$$

In using the relative intensity of two shaped beam signals with different center rays $r_1$, $r_2$, where the two beams have identical shapes but are aimed in different directions, the difference in the logarithms of intensity is $$\Delta \ln I = -\frac{|r-r_1|^2}{2\sigma^2} + \frac{|r-r_2|^2}{2\sigma^2} = \frac{1}{2\sigma^2}(2r \cdot r_{12} + |r_{12}|^2),$$

where the $r \cdot r_{12}$ term is the projection of the position along the line joining the beam centers, and the $|r_{12}|^2$ is the beam center distance squared. Terms $\sigma^2$ and $|r_{12}|$ are known characteristics of the beam intensity profiles; thus $r \cdot r_{12}$ can be calculated easily. As shown in FIG. 6, the one-dimensional position along the line joining the beam centers, d 604 is given by $d = r \cdot r_{12}/|r_{12}|$. This calculation requires only the use of addition and multiplication or division, which enables the use of inexpensive microcontrollers to accomplish this task quickly. The logarithm of the signal intensity is often available directly since radio receivers often provide received signal strength indicator (RSSI) on a logarithmic scale.

In some embodiments the local position may be calculated by response units using the relative intensity of multiple shaped beam signals rather than their absolute intensity. This approach offers the advantage of automatically compensating for many distortions of beams that emanate from the same beam transmitter. If the distortions occur equally for beams from the same receiver, then the relative signal intensity of the beams remains the same in spite of these distortions. Continuing the Gaussian signal example from above, the intensity constant $t_0$ is not used in the position calculation; thus only the relative intensity of the two beams is used.

Accurate calculations of local positions depend in part on the precision of the manufacturing, installation, and calibration of the beam transmission units and the shaped beam signals. Different embodiments may employ levels of precision that are appropriate to their application. For example, embodiments may allow local position to be accurate within 3 feet, within 1 foot, or within 1 inch, or approximately 1 m, 0.3 m, 2.5 cm or any other accuracy level as desired by the particular application.

Some embodiments use shaped beam antennas that project high quality beams, and are well aligned in order for the calculated position to be precise and reliable. Precision of antenna fabrication enables the achievement of precise location determination. In some embodiments the dimensions of the shaped beam antennas may be maintained to 0.5 mm precision. In addition, the beam directions may be aligned so that the beam spot uncertainty at the Unit plane is below the expected location accuracy to enable the desired accuracy. For a nominal operating scenario with a desired accuracy of approximately 1 feet this translates into an alignment precision of below 1 mrad. This precision is achievable with commercial sighting and surveying tools, and proper mechanical mounting should hold this alignment indefinitely. In some embodiments the antennas may also have additional absorbing elements to improve the beam shape and control side lobes.

Figure 7:
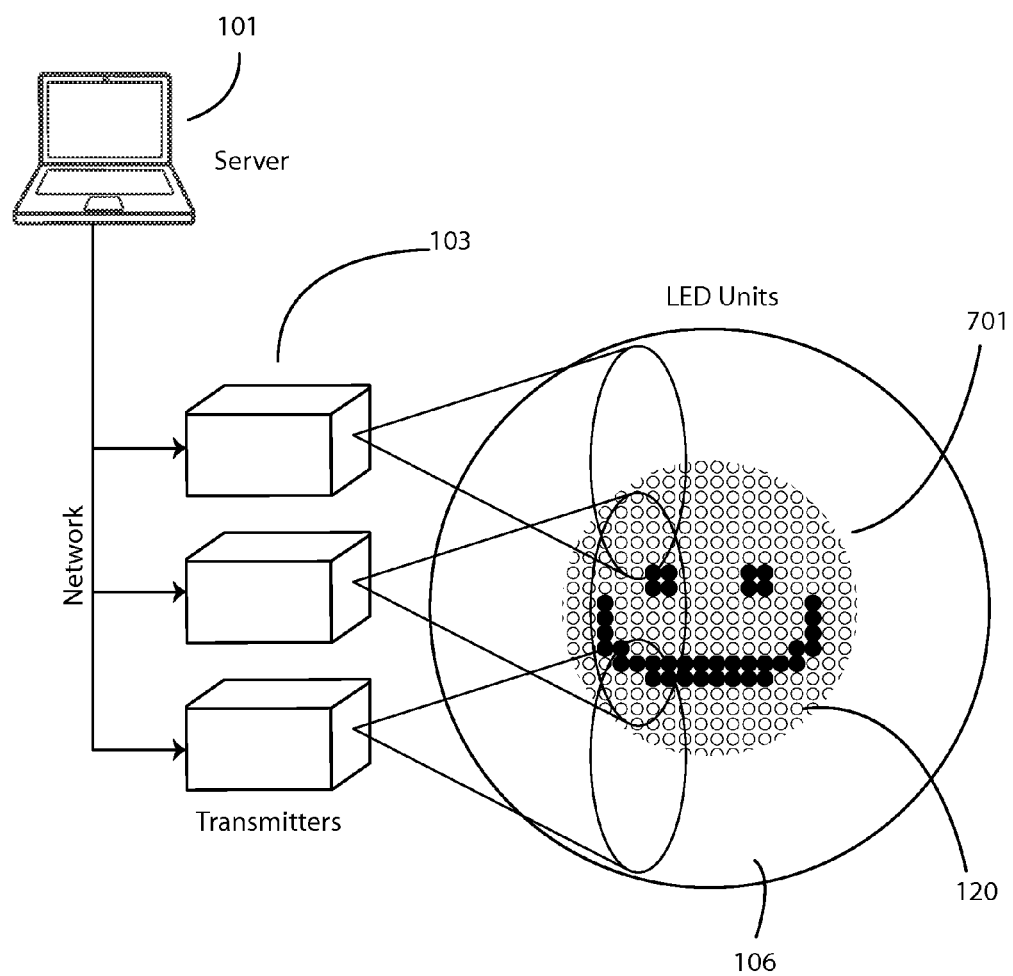
FIG. 7 illustrates an embodiment of a local positioning and response system that is used to project a graphical image onto a multiplicity of response units, with each response unit providing a pixel of the image.
Figure 8:
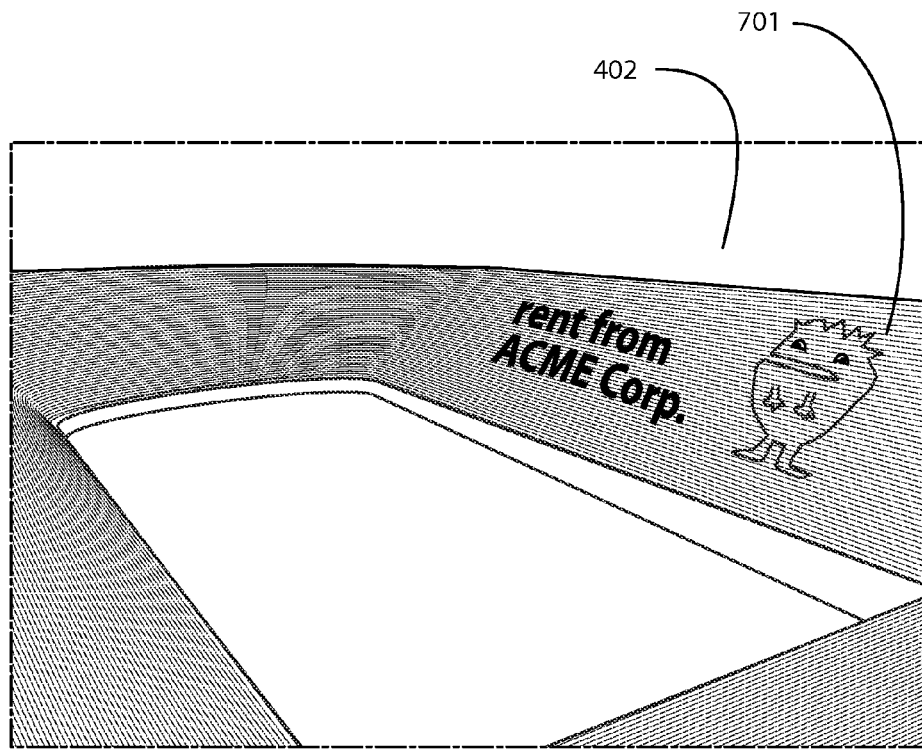
FIG. 8 illustrates an embodiment of the system used to project graphical images onto the stands of a stadium.

Some embodiments provide for the display of images on a set of response units. For example, as mentioned above, an embodiment of the system may be used to create large images, text messages and videos or any combination thereof within an area such as a stadium by providing light-emitting response units to the spectators. In some of these embodiments, the server computer may store or generate one or more graphical images and transmit messages to the response units to display these images on the response units. Some embodiments may treat each response unit as a pixel in the image. The processor of each response unit may calculate its location, and then determine the intensity and color of the light to emit from the response unit based on its location and on the image messages received from the server. The combination of all response units forms an overall image. This is illustrated in FIG. 7, with server 101 sending shaped beams and messages via beam transmitter 103 to local area 106. A large number of response units 120 are located in the local area, each equipped to emit light and form a single pixel of image 701. FIG. 8 illustrates an embodiment with such image display applied to an entire stadium 402. Here the image 701 is spread across the stands of the stadium with each spectator providing a pixel of the image. The server may also break an image into sub-images and send different messages to groups of response units to construct an overall image from the sub-images.

Figure 9:
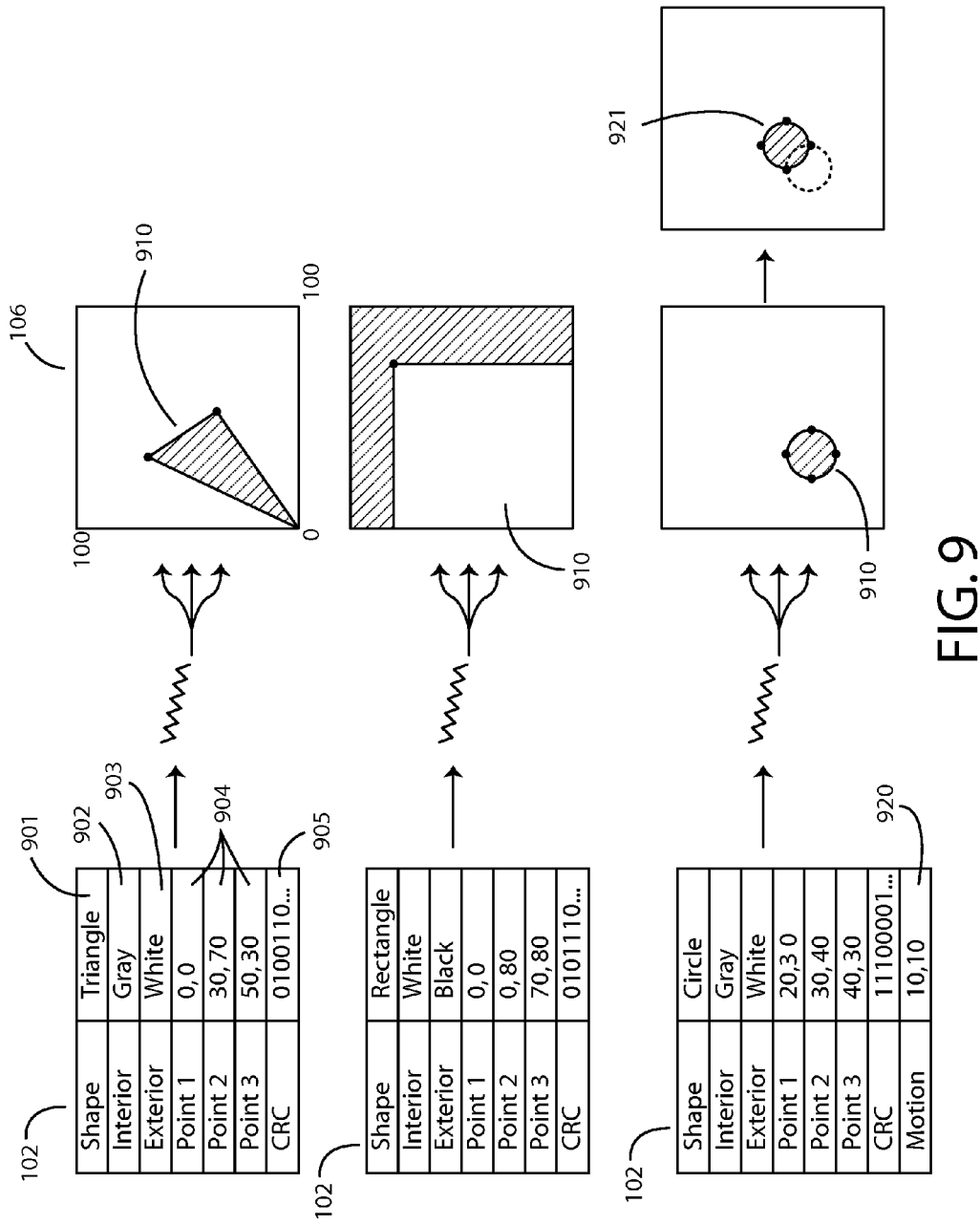
FIG. 9 illustrates an embodiment of messages that may be used by a local positioning and response system to send graphical image descriptors to an array of response units.

Messages from the server to display graphical images may in some embodiments contain descriptions of one or more shapes. FIG. 9 illustrates an embodiment of a system using this type of graphical message. For example, these messages 102 might identify the type of shape 901, such as rectangle, triangle, circle, or any other shape; points on the shape defining its perimeter 904; and the color of the interior 902 and exterior 903 of the shape. These messages may be broadcast to response units in local area 106, and each response unit may determine based on its location whether it is in the interior or exterior of the shape. Such techniques allow broadcast messages 102 to control the display 910 generated by a possibly large number of response units.

In some embodiments the messages with shapes might further define the motion of shapes over time. For example a message might include a velocity vector 920 that defines the direction and speed of a shape's motion. Response units can use the motion data to calculate their displays over time 910, 921. Such techniques make communication between the server and the response units more efficient since a single message can control changing displays over a period of time.

In other embodiments the messages from the server may carry additional information, such as timestamps for the current time, other timing information for synchronization of actions, required duration of motions, or descriptions of periodic or repeated motions. Other embodiments may use more sophisticated graphics, such as multi-layer shapes, parameterized shapes or curves, or texture codes. In some embodiments the calibrated locations of the transmitters, or the definition of the predefined shapes of the shaped beam signals, may be sent to assist with calculation of local positions.

In some embodiments the messages from the server may include error detection codes or error correction codes 905. Since some embodiments use broadcast messages from the server, it may not be efficient in some embodiments to use acknowledgements or retransmissions to ensure reliable communication. Embedding error detection or correction codes into the messages improves the reliability of these broadcast messages without complex two-directional communication.

The local area for some embodiments of the system may include, without limitation, a sports stadium (as illustrated in 402), sports field, concert hall, amphitheater, theater, track, gymnasium, or arena.

Figure 10:
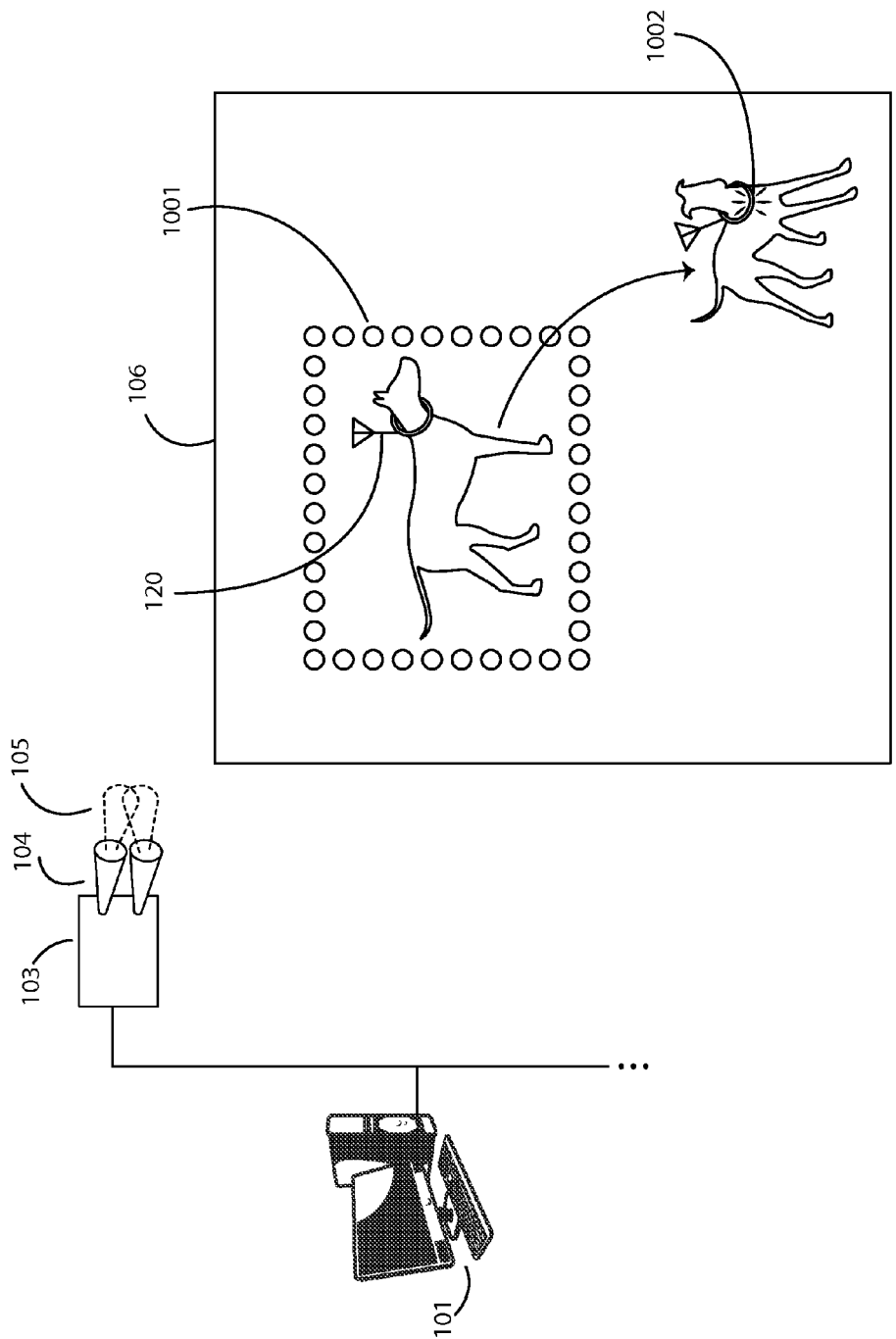
FIG. 10 illustrates an embodiment of a local positioning and response system used to provide a virtual fence.

Applications for some embodiments of the system may include providing a virtual fence around a portion of a local area. FIG. 10 illustrates such an embodiment with virtual fence 1001 defined to cover a portion of local area 106. In these embodiments response units 120 may be equipped with feedback devices that are actuated when a response unit moves out of or close to the boundary 1001 of this virtual fenced-in portion. For example, the wearer of a response unit might be given a shock 1002 to stop the wearer from leaving the fenced-in portion.

In other applications in one or more other embodiments, the system may provide warnings to other users about the approach or entry of a device or user into a defined area. For example, in one or more embodiments response units may be integrated into vehicles, and defined areas of possible safety hazards may be defined and/or otherwise detected by the system (somewhat similar to the virtual fences described above). As a vehicle approaches such an area, an embodiment of the response unit in the vehicle may detect its position and inform the server of its approach. The server may in turn send messages to other response units that may for example be embedded into road signs or road reflectors or other vehicles. These response units may be commanded to light up to alert other drivers of the approach of another vehicle. Such as system may for example be used to warn a vehicle of the approach of another vehicle around a blind turn. In one or more embodiments, one or more vehicles may also include an embodiment of the response unit and automatically dim headlights, for example when within a predefined distance from another of the response units mounted on another vehicle, e.g., 100 meters or the local limit according to the law at that location. One or more embodiments may also lower the sound volume in the vehicle audio system, play an alert audio, or otherwise prepare the vehicle for oncoming traffic based on position as determine by a response unit accessible by the vehicle, whether on the road or a sign or marker proximal to the vehicle, or on or in the vehicle. Alternatively or in combination, one or more embodiments may detect road conditions and tag the event with a position, so that other vehicles approaching the road condition, e.g., ice detected by the slip detection module in the vehicle and/or accelerometers are alerted to the road condition at a location and for example time. Road markers that may detect snow or ice or water or any other physical condition and send a message including the position is in keeping with the spirit of the invention.

Figure 11:
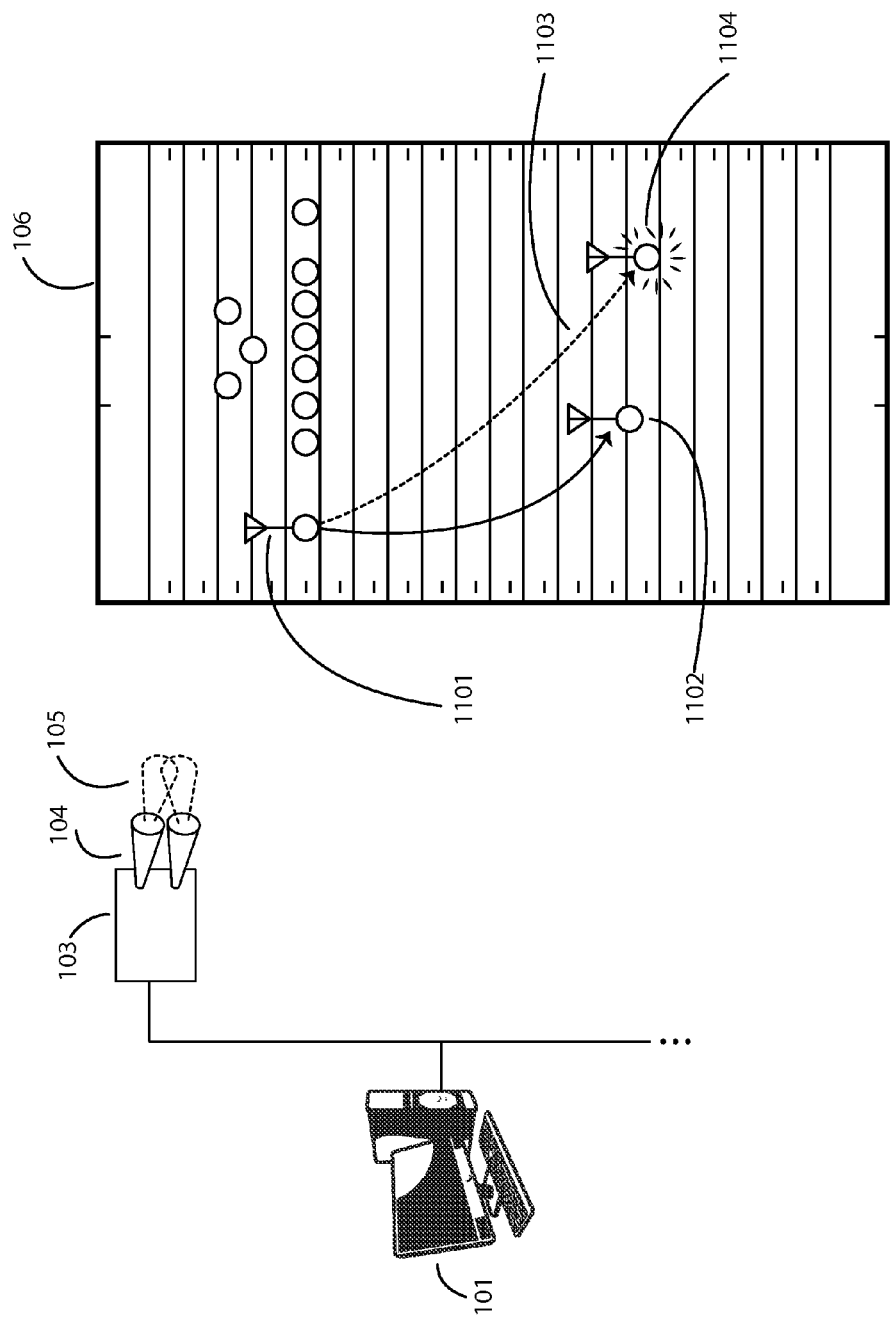
FIG. 11 illustrates an embodiment of a local positioning and response system used to provide visible feedback if a football player makes an error in his desired pattern.

Other applications in other embodiments may include feedback to sports players or coaches when a player moves into or out of a prescribed location, area, or trajectory. FIG. 11 illustrates such an embodiment that is used to check whether a football receiver in practice may be practicing running a particular pattern. The player might wear a response unit that lights up or turns a different color if the player does not run the correct pattern. This feedback might alert coaches that the player made an error. In the example shown, player 1101 wearing a response unit is supposed to run a pattern terminating at location 1102. Instead the player runs in trajectory 1103, and his response unit provides visual feedback 1104 of the error.

Figure 12:
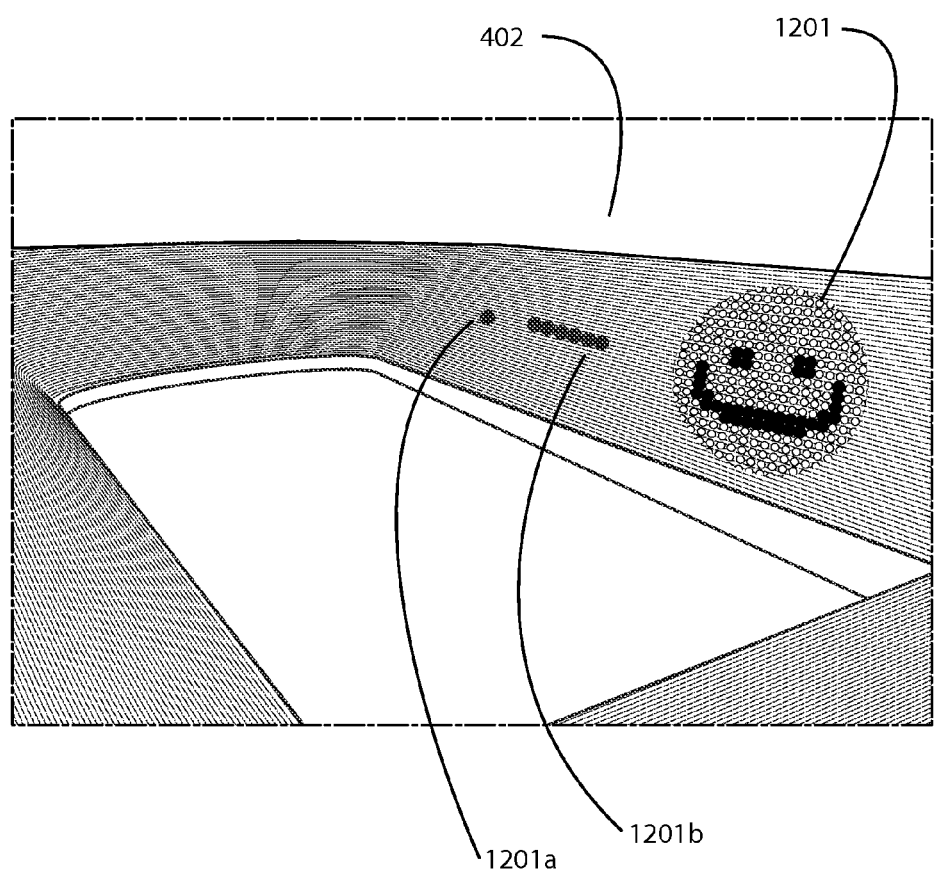
FIG. 12 illustrates an embodiment of a local positioning and response system used to indicate what subset of a group of spectators are winners of a prize.

FIG. 12 illustrates an embodiment of a system to award prizes or otherwise indicate a subset of the response units. For example, server messages might select particular locations for awards and send messages to provide feedback to response units in only those locations that they have won awards. The selection of response units for awards or prizes may for example be random, based on location, based on sensor readings, or based on user input. Response units are distributed to spectators in a stadium 402. Various images are displayed throughout an event, but at some point an announcement is made that only a portion of the spectators will receive a prize. Then the display is changed to provide image 1201 in the stands, and spectators within that image will receive the prize. Alternatively or in combination, a single response unit 1201a may be asserted or information otherwise displayed thereon in a lottery style application, or to show information related to that particular location in a museum, art gallery or scavenger hunt scenario, or a row or other geometrical shape based set of response units 1201b such as a winning row may be asserted or otherwise provided with information or a capability.

While the invention herein disclosed has been described by means of specific embodiments and applications thereof, numerous modifications and variations could be made thereto by those skilled in the art without departing from the scope of the invention set forth in the claims.

What is claimed is:

1. A local positioning and response system comprising
a server computer configured to store a message associated with at least one position;
one or more transmission units coupled with said server computer wherein each of said one or more transmission units transmit shaped beam signals and comprise
a plurality of shaped beam antennas, each configured to transmit a shaped beam signal to at least a portion of an area, wherein each of said shaped beam signals has a respective predefined intensity profile; and
one or more response units located in said area, each comprising
a receiver configured to receive said shaped beam signals;
one or more action modules configured to emit one or more physical signals;
a processor coupled with said one or more action modules and said receiver, wherein said
processor is configured to
calculate a local position from a relative intensity of said shaped beam signals,
calculate an individual response to said message, based on said local position and on contents of said message, and
command said one or more action modules to emit said one or more physical signals based on said individual response;
wherein said one or more physical signals emitted by said one or more action modules comprise light;
wherein said server computer is configured with one or more graphical images to be displayed on a plurality of said one or more action modules, wherein each of said one or more action modules displays one pixel of each fit said one or more graphical images;
wherein said server computer is further configured to generate said message to display said one or more graphical images on said plurality of said one or more action modules; and,
wherein said processor coupled with said one or more response units is further configured to calculate intensity and color of the light to emit from each of said one or more action modules based on said message and on the local position of said one or more response units.

2. The system of claim 1, further comprising one or more message transmission units and one or more cameras coupled to said one or more message transmission units;
wherein said server computer is further configured to send one or more test pattern messages to said one or more response units via said one or more message transmission units;
wherein said one or more response units are further configured to respond to said one or more test pattern messages with physical signals visible to said one or more cameras; and,
wherein said server computer is further configured to
obtain images from said one or more cameras coupled to said one or more message transmission units after sending said one or more test pattern messages;
analyze said images to determine distortion of said images generated by said one or more response units in comparison to said one or more test pattern messages; and,
apply distortion corrections to subsequent messages to compensate for said distortion.

3. The system of claim 2, wherein
said one or more action modules are coupled with said one or more response units, wherein said one or more action modules further comprise an emitter of light frequencies outside visible spectrum; and,
said one or more cameras coupled with said one or more message transmission units are configured to receive said light frequencies outside the visible spectrum.

4. The system of claim 1, wherein
said one or more response units further comprise one or more sensors; and,
said processor is coupled to each of said one or more response units and is further configured to
obtain a value of said one or more sensors; and
calculate said individual response to each of said message, based on one or more of said calculated local position, said contents of said message, and said value of said one or more sensors.

5. The system of claim 4, wherein said one or more sensors comprise accelerometers, gyroscopes, rate gyroscopes, pressure sensors, temperature sensors, magnetometers, sensors of human physiology, depth sensors, motion sensors, velocity sensors, or proximity sensors.

6. The system of claim 4, wherein
said one or more response units further comprise a transmitter;
said one or more transmission units further comprise a receiver coupled with said one or more transmission units; and,
said processor coupled to each of said one or more response units is further configured to transmit sensor values via said transmitter to said receiver coupled with said one or more transmission units.

7. The system of claim 4, wherein said message includes criteria for said value of said one or more sensors, and said processor coupled to each of said one or more response units is further configured to transmit said value of said one or more sensors if said value meet said criteria.

8. The system of claim 1, wherein
said one or more response units further comprise a transmitter and a user input device;
said one or more transmission units further comprise a receiver coupled with said one or more transmission units; and,
said processor is coupled to each of said one or more response units and is further configured to transmit a user input from said user input device via said transmitter to said receiver coupled with said one or more transmission units.

9. The system of claim 1 wherein said one or more physical signals comprise one or more of light, sound, vibration, non-visible light, electricity, shock, and buzzing.

10. The system of claim 1, wherein said one or more response unit are configured to be worn by or held by a person.

11. The system of claim 1 wherein
said shaped beam signals are approximately Gaussian, with an intensity varying approximately as a logarithm of $$I = I_0 e^{-|r-r_c|^2/2\sigma^2};$$

and,
  said calculate the local position of said one or more response unit uses the logarithm from said shaped beam signals to determine said local position.

12. The system of claim 1 wherein said calculate the local position of said one or more response unit uses the relative intensity of multiple shaped beam signals of said shaped beam signals rather than their absolute intensity.

13. The system of claim 1 wherein manufacturing, installation, and calibration of said one or more transmission units and said shaped beam signals are sufficiently precise to allow said local position to be accurate to a predefined range, wherein said predefined range is 3 feet or less.

14. The system of claim 1 wherein manufacturing, installation, and calibration of said one or more transmission units and said shaped beam signals are sufficiently precise to allow said local position to be accurate to a predefined range, wherein said predefined range is 1 foot or less.

15. The system of claim 1 wherein manufacturing, installation, and calibration of said one or more transmission units and said shaped beam signals are sufficiently precise to allow said local position to be accurate to a predefined range, wherein said predefined range is 1 inch or less.

16. The system of claim 1 wherein
  said one or more response units are divided into groups; and,
  said server computer is further configured to send different messages to different groups of said groups to break said one or more graphical images into sub-images.

17. The system of claim 1 wherein said message comprises one or more shapes to be displayed by a plurality of said one or more action modules.

18. The system of claim 17 wherein
  said message comprises motion of said one or more shapes; and,
  said processor is coupled with said one or more response units and is further configured to calculate a sequence of light intensities and colors over time to be displayed based on said motion of said one or more shapes.

19. The system of claim 1 wherein said message comprises error detection or error correction codes.

20. The system of claim 1 further comprising a virtual fence with feedback that is provided when a response unit of said one or more response units moves out of a defined local region.

21. The system of claim 1 wherein said one or more action modules comprise one or more feedback devices configured to provide feedback to sports players or coaches when a player of said sports players moves into or out of a prescribed location, area, or trajectory.

22. The system of claim 1 wherein said area comprises one or more of a sports stadium, sports field, concert hall, amphitheater, theater, track, gymnasium, or arena.

23. The system of claim 1 wherein said server computer is further configured to provide notification to a subset of response units of said one or more response units, wherein said notification comprises wherein said subset of response units has won a contest or is eligible for a prize.

24. The system of claim 1 wherein said one or more messages do not comprise an Internet Protocol address.

25. The system of claim 1 wherein said message comprises an Internet Protocol address.

26. The system of claim 1 wherein said one or more transmission units transmit a demodulation signal and wherein said one or more response units utilize said demodulation signal to demodulate a signal and obtain said message.

27. A local positioning and response system comprising
  a server computer configured to store a message associated with at least one position;
  one or more transmission units coupled with said server computer wherein each of said one or more transmission units transmit shaped beam signals and comprise
    a plurality of shaped beam antennas, each configured to transmit a shaped beam signal to at least a portion of an area, wherein each of said shaped beam signals has a respective predefined intensity profile;
  one or more response units located in said area, each comprising
    a receiver configured to receive said shaped beam signals;
    one or more action modules configured to emit one or more physical signals;
    a processor coupled with said one or more action modules and said receiver, wherein said processor is configured to
      calculate a local position from a relative intensity of said shaped beam signals,
      calculate an individual response to said message, based on said local position and on contents of said message, and
      command said one or more action modules to emit said one or more physical signals based on said individual response; and,
  one or more message transmission units and one or more cameras coupled to said one or more message transmission units;
  wherein said server computer is further configured to send one or more test pattern messages to said one or more response units via said one or more message transmission units;
  wherein said one or more response units are further configured to respond to said one or more test pattern messages with physical signals visible to said one or more cameras; and,
  wherein said server computer is further configured to
    obtain images from said one or more cameras coupled to said one or more message transmission units after sending said one or more test pattern messages;
    analyze said images to determine distortion of said images generated by said one or more response units in comparison to said one or more test pattern messages; and,
    apply distortion corrections to subsequent messages to compensate for said distortion.

28. The system of claim 27, wherein
  said one or more action modules are coupled with said one or more response units, wherein said one or more action modules further comprise an emitter of light frequencies outside a visible spectrum; and,
  said one or more cameras coupled with said one or more message transmission units are configured to receive said light frequencies outside the visible spectrum.

29. A local positioning and response system comprising
  a server computer configured to store a message associated with at least one position;
  one or more transmission units coupled with said server computer wherein each of said one or more transmission units transmit shaped beam signals and comprise a plurality of shaped beam antennas, each configured to transmit a shaped beam signal to at least a portion of an area, wherein each of said shaped beam signals has a respective predefined intensity profile;

one or more response units located in said area, each comprising a receiver configured to receive said shaped beam signals;

one or more action modules configured to emit one or more physical signals;

a processor coupled with said one or more action modules and said receiver, wherein said processor is configured to calculate a local position from a relative intensity of said shaped beam signals, calculate an individual response to said message, based on said local position and on contents of said message, and command said one or more action modules to emit said one or more physical signals based on said individual response;

wherein said one or more response units further comprise one or more sensors;

wherein said one or more sensors comprise accelerometers, gyroscopes, rate gyroscopes, pressure sensors, temperature sensors, magnetometers, sensors of human physiology, depth sensors, motion sensors, velocity sensors, or proximity sensors; and, wherein said processor is coupled to each of said one or more response units and is further configured to obtain a value of said one or more sensors; and calculate said individual response to each of said message, based on one or more of said calculated local position, said contents of message, and said value of said one or more sensors.

30. A local positioning and response system comprising a server computer configured to store a message associated with at least one position;

one or more transmission units coupled with said server computer wherein each of said one or more transmission units transmit shaped beam signals and comprise a plurality of shaped beam antennas, each configured to transmit a shaped beam signal to at least a portion of an area, wherein each of said shaped beam signals has a respective predefined intensity profile;

one or more response units located in said area, each comprising a receiver configured to receive said shaped beam signals;

one or more action modules configured to emit one or more physical signals;

a processor coupled with said one or more action modules and said receiver, wherein said processor is configured to calculate a local position from a relative intensity of said shaped beam signals, calculate an individual response to said one or more messages, based on said local position and on contents of said one or more messages, and command said one or more action modules to emit said one or more physical signals based on said individual response;

wherein said one or more response units further comprise one or more sensors;

wherein said processor is coupled to each of said one or more response units and is further configured to obtain a value of said one or more sensors; and calculate said individual response to each of said message, based on one or more of said calculated local position, said contents of said message, and said value of said one or more sensors;

wherein said one or more response units further comprise a transmitter;

wherein said one or more transmission units further comprise a receiver coupled with said one or more transmission units; and, wherein said processor coupled to each of said one or more response units is further configured to transmit sensor values via said transmitter to said receiver coupled with said one or more transmission units.

31. A local positioning and response system comprising a server computer configured to store a message associated with at least one position;

one or more transmission units coupled with said server computer wherein each of said one or more transmission units transmit shaped beam signals and comprise a plurality of shaped beam antennas, each configured to transmit a shaped beam signal to at least a portion of an area, wherein each of said shaped beam signals has a respective predefined intensity profile;

one or more response units located in said area, each comprising a receiver configured to receive said shaped beam signals;

one or more action modules configured to emit one or more physical signals;

a processor coupled with said one or more action modules and said receiver, wherein said processor is configured to calculate a local position from a relative intensity of said shaped beam signals, calculate an individual response to said message, based on said local position and on contents of said message, and command said one or more action modules to emit said one or more physical signals based on said individual response;

wherein said one or more response units further comprise one or more sensors;

wherein said processor is coupled to each of said one or more response units and is further configured to obtain a value of said one or more sensors; and calculate said individual response to each of said message, based on one or more of said calculated local position, said contents of said message, and said value of said one or more sensors; and, wherein said message include criteria for said value of said one or more sensors, and said processor coupled to each of said one or more response units is further configured to transmit said value of said one or more sensors if said value meet said criteria.

32. A local positioning and response system comprising a server computer configured to store a message associated with at least one position;

one or more transmission units coupled with said server computer wherein each of said one or more transmission units transmit shaped beam signals and comprise a plurality of shaped beam antennas, each configured to transmit a shaped beam signal to at least a portion of an area, wherein each of said shaped beam signals has a respective predefined intensity profile; and, one or more response units located in said area, each comprising a receiver configured to receive said shaped beam signals;

one or more action modules configured to emit one or more physical signals;

a processor coupled with said one or more action modules and said receiver, wherein said processor is configured to calculate a local position from a relative intensity of said shaped beam signals, calculate an individual response to said message, based on said local position and on contents of said message, and command said one or more action modules to emit said one or more physical signals based on said individual response;

wherein said shaped beam signals are approximately Gaussian, with an intensity varying approximately as a logarithm of $$I = I_0 e^{-|r-r_c|^2/2\sigma^2};$$

and, wherein said calculate the local position of said one or more response unit uses the logarithm from said shaped beam signals to determine said local position.

33. A local positioning and response system comprising a server computer configured to store a message associated with at least one position;

one or more transmission units coupled with said server computer wherein each of said one or more transmission units transmit shaped beam signals and comprise a plurality of shaped beam antennas, each configured to transmit a shaped beam signal to at least a portion of an area, wherein each of said shaped beam signals has a respective predefined intensity profile; and, one or more response units located in said area, each comprising a receiver configured to receive said shaped beam signals;

one or more action modules configured to emit one or more physical signals;

a processor coupled with said one or more action modules and said receiver, wherein said processor is configured to calculate a local position from a relative intensity of said shaped beam signals, calculate an individual response to said message, based on said local position and on contents of said message, and command said one or more action modules to emit said one or more physical signals based on said individual response; and, wherein manufacturing, installation, and calibration of said one or more transmission units and said shaped beam signals are sufficiently precise to allow said local position to be accurate to a predefined range, wherein said predefined range 3 feet or less.

* * * * *